(12) United States Patent
Kim et al.

(10) Patent No.: US 7,258,722 B2
(45) Date of Patent: Aug. 21, 2007

(54) PROCESS FOR MANUFACTURING ULTRA FINE TIC-TRANSITION METAL-BASED COMPLEX POWDER

(75) Inventors: Byoung Kee Kim, Dongre-ku (KR); Seong Hyeon Hong, Gyeong Sungnam-do (KR); Yong Won Woo, Kyunggi-do (KR)

(73) Assignee: Korea Institute of Machinery and Materials, Taejon (KR)

( * ) Notice: Subject to any disclaimer, the term of this patent is extended or adjusted under 35 U.S.C. 154(b) by 112 days.

(21) Appl. No.: 10/747,657

(22) Filed: Dec. 30, 2003

(65) Prior Publication Data

US 2004/0216559 A1 Nov. 4, 2004

(30) Foreign Application Priority Data

Apr. 29, 2003 (KR) ................................ 2003-26985

(51) Int. Cl.
*C01B 31/34* (2006.01)
*B22F 9/20* (2006.01)
(52) U.S. Cl. .......................... 75/351; 75/369; 423/440
(58) Field of Classification Search ................. 75/351, 75/369; 423/440
See application file for complete search history.

(56) References Cited

U.S. PATENT DOCUMENTS

| | | | | |
|---|---|---|---|---|
| 2,491,410 A | * | 12/1949 | Laughlin et al. | ............... 501/87 |
| 3,379,647 A | * | 4/1968 | Smudski | ..................... 252/640 |
| 3,488,291 A | * | 1/1970 | Hardy et al. | .................. 75/236 |
| 3,914,113 A | * | 10/1975 | Chiu | ........................ 428/539.5 |
| 5,166,103 A | * | 11/1992 | Krstic | .......................... 501/87 |
| 6,214,309 B1 | * | 4/2001 | Shaw et al. | .................. 423/345 |
| 6,293,989 B1 | * | 9/2001 | Kim et al. | ................... 423/440 |
| 6,511,551 B2 | * | 1/2003 | Kim et al. | ................... 148/237 |
| 6,793,875 B1 | * | 9/2004 | Shaw et al. | .................... 419/18 |
| 2002/0043130 A1 | | 4/2002 | Kim et al. | |

* cited by examiner

*Primary Examiner*—Ngoclan T. Mai
(74) *Attorney, Agent, or Firm*—Lowe, Hauptman, & Berner LLP

(57) ABSTRACT

Any one of a Ti-containing water-soluble salt, metatitanic acid $(TiO(OH)_2)$ slurry and ultra fine titanium oxide powder, and a transition metal containing metal salt are dissolved in water to prepare a raw material mixture. The raw material is spray-dried to obtain precursor powder, which is calcined to form ultra fine Ti/transition metal complex oxide and is then mixed with nano-sized carbon particles and subjected to reduction and carburization in a non-oxidizing atmosphere.

9 Claims, 4 Drawing Sheets

PROCESS FOR MANUFACTURING ULTRA FINE TIC-TRANSITION METAL-BASED COMPLEX POWDER

BACKGROUND OF THE INVENTION

1. Field of the Invention

The present invention relates to a method for producing ultra fine TiC-transition metal based complex powder, and more particularly, to a method for producing nano-sized TiC-transition metal based complex powder for use in a solid carbide cutting tool.

2. Background of the Related Art

TiC is known as a material added to WC—TiC—Co based solid carbide cutting tools to increase high temperature hardness and inhibit reaction with stainless steel to be cut. Also, it is used as a main ingredient of TiC based cermet tools. Recently, it has been found that when ultra fine powders of TiC based carbides are used in a tool, the tool has increased hardness, transverse-rupture strength and wear-resistance. Therefore, TiC based powder as fine as possible is used in production of tools or molds.

According to the conventional methods for producing TiC powder, a powder mixture of TiO2 and carbon or a powder mixture of titanium hydride (TiH2) and carbon is subjected to a thermal treatment at a high temperature of 1700° C. to 2000° C. in a non-oxidizing atmosphere, such as vacuum, inert atmosphere, hydrogen atmosphere, for reduction by carbon and carburization, to prepare TiC powder. However, such methods have disadvantages in that the invested cost of equipments is great and the power consumption is much, since reaction temperature is so high. Also, the produced TiC powder has a particle size of about 1 to 2 μm.

Meanwhile, the coarse TiC powder may be ball-milled to form ultra fine TiC powder. However, the TiC powder thus obtained has an average particle size 0.7 μm, and it is difficult to refine grains having such particle size. Also, during milling, impurities may be introduced to the powder.

SUMMARY OF THE INVENTION

Accordingly, the present invention has been made in view of the above problems, and it is an object of the present invention to provide ultra fine TiC-transition metal based complex powder by dissolving or mixing a Ti-containing water-soluble salt, metatitanic acid (TiO(OH)2) slurry or ultra fine titanium oxide powder into a solution of a metal salt containing a transition metal dissolved in water, spray-drying the solution, subjecting the dried product to a thermal treatment for oxidation to obtain Ti/transition metal complex oxide, mixing the complex oxide with nano-sized carbon particles, and subjecting the mixture to a thermal treatment for reduction/carburization.

To achieve the above object, in one embodiment, the present invention provides a method for producing ultra fine TiC-transition metal complex powder comprising the steps of: dissolving or dispersing a compound containing Ti and a metal salt containing a transition metal in water to prepare a raw material mixture; spray-drying the raw material mixture to obtain precursor powder; calcining the precursor powder to form ultra fine Ti-transition metal complex oxide powder; mixing the Ti-transition metal complex oxide with nano-sized carbon particles, followed by drying; and subjecting the dried complex oxide powder to a thermal treatment for reduction/carburization in a non-oxidizing atmosphere.

The raw material mixture is preferably prepared by dissolving a water-soluble salt containing Ti, metatitanic acid [TiO(OH)$_2$] slurry or ultra fine titanium oxide powder, and a water-soluble metal salt containing a transition metal. Here, the transition metal is preferably contained in the complex powder in the range of 1 to 30 wt %.

Preferably, the calcination is performed at a temperature between 350° C. to 1000° C.

Also, the thermal treatment for reduction/carburization is performed by reduction at a temperature of 600° C. to 1100° C. in a non-oxidizing atmosphere such as vacuum, inert atmosphere, hydrogen atmosphere, etc., and then reduction and carburization at a temperature of 1200° C. to 1350° C.

BRIEF DESCRIPTION OF THE DRAWINGS

The above and other objects, features and advantages of the present invention will be apparent from the following detailed description of the preferred embodiments of the invention in conjunction with the accompanying drawing, in which.

DETAILED DESCRIPTION OF THE PREFERRED EMBODIMENT

Figure 1:
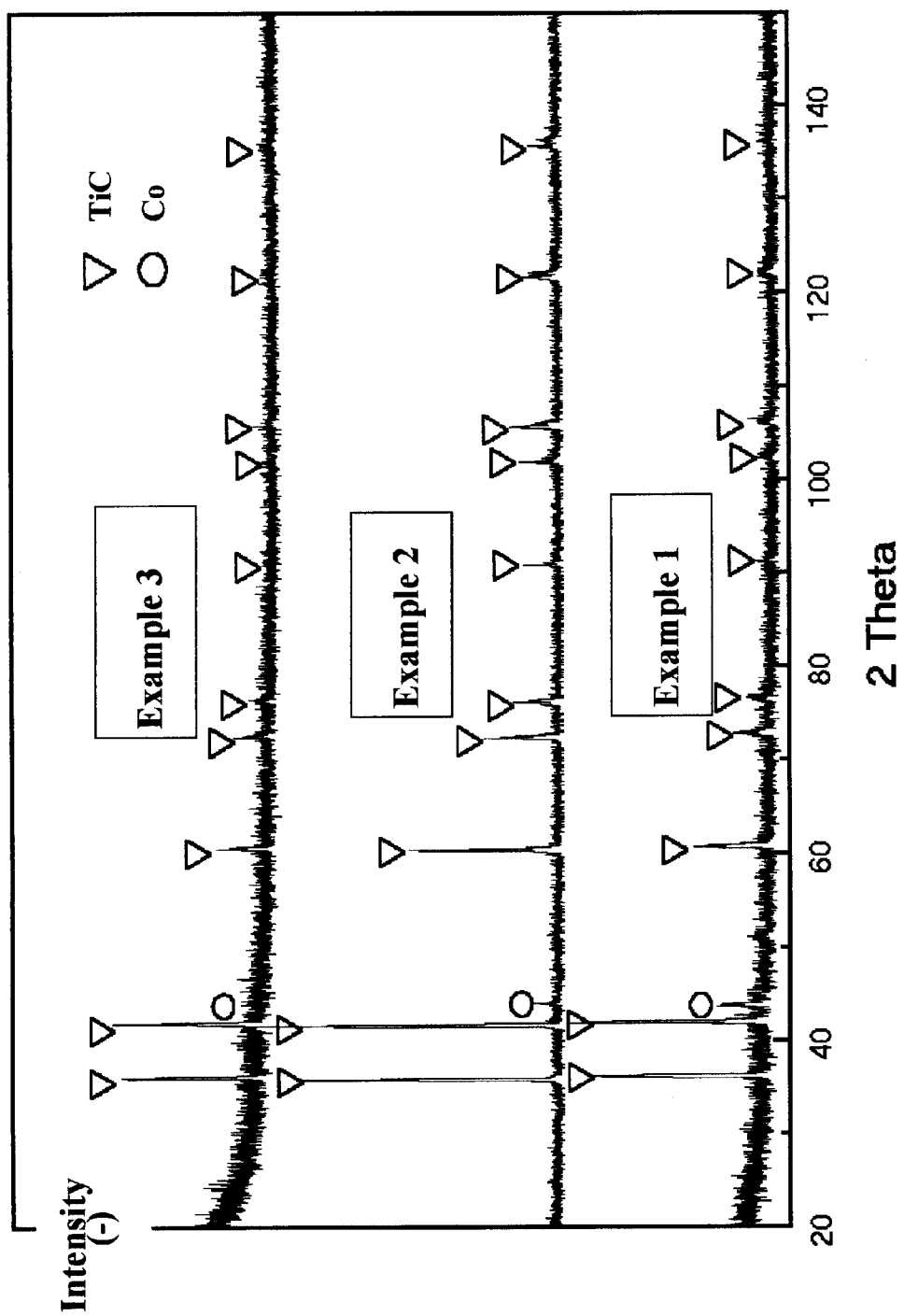
FIG. 1 is a graph showing X-ray diffraction pattern of the TiC—Co complex powder prepared according to the present invention.

Now, the present invention is described in detail.

Firstly, in order to prepare the TiC-transition metal based complex powder having the desired composition according to the present invention, a Ti-containing material and a metal salt containing a transition metal are dissolved or dispersed in an aqueous solution, thereby forming a raw material mixture. Here, the raw material mixture may be prepared by mixing a Ti-containing salt, metatitanic acid (TiO(OH)$_2$) slurry or Ti-containing oxide powder into an aqueous solution, wherein a transition metal-containing salt is dissolved.

Preferably, the raw material mixture is prepared by dissolving any one of a Ti-containing water-soluble salt, metatitanic acid (TiO(OH)$_2$) slurry and ultra fine titanium oxide powder, and a transition metal-containing water-soluble metal salt in water. For example, a Ti-containing water-soluble salt and a transition metal-containing metal salt are dissolved in water, or metatitanic acid (TiO(OH)$_2$) slurry or ultra fine TiO$_2$ powder is mixed into aqueous solution of a transition metal-containing metal salt dissolved in water. Only by using this raw material mixture, it is possible to obtain ultra fine Ti-transition metal based complex oxide powder after spray-drying or calcination.

The transition metal usable in the present invention includes Co, Fe, Ni and the like. The added amount of the transition metal is preferably in the range of 1 to 30 wt % based on the total weight of the complex powder. When the added amount of the transition metal is 1 wt % or less based on the total weight of the complex powder, the thermal treatment to form TiC should be necessarily performed at a high temperature of over 1600° C., while when 30 wt % or more, the produced TiC-transition metal complex powder has a strong tendency to aggregate. Therefore, the amount of the transition metal in the TiC-transition metal complex powder is preferably in the range of 1 to 30 wt %.

Once the raw material mixture is prepared, the raw material mixture is spray-dried under common conditions to form precursor powder.

Next, the precursor powder is calcined and unnecessary ingredients other than the metal ingredients are removed by volatilization or reaction. As a result, ultra fine Ti/transition metal complex oxide is formed. The calcination is preferably performed at a temperature in the range of 350° C. to 1000° C. When the temperature of the calcination is lower than 350° C., non-metal organic compounds may remain. When the calcination is performed at a temperature of over 1000° C., since the complex oxide may grow, ultra fine oxide cannot be formed and the powder has a strong tendency to aggregate.

Then, nano-sized carbon particles are introduced to a milling jar, where the ultra fine Ti-transition metal complex oxide powder has been already loaded, and sufficiently milled in a dry atmosphere or a wet atmosphere such as hexane to thoroughly mix with the complex oxide.

The dried and mixed complex oxide powder may be reduced and carburized in a non-oxidizing atmosphere to form nano-sized TiC-transition metal based complex powder.

The reduction and cariburization process includes heating at a temperature of 600° C. to 1100° C. in a non-oxidizing atmosphere such as inert atmosphere, hydrogen atmosphere, etc. to reduce the transition metal based oxide and then at 1200° C. to 1350° C. to reduce and cariburize Ti based oxides.

Here, it is preferred that the reduction of the transition metal is at least 600° C., preferably between 600° C. to 1100° C. When the reduction of the transition metal is performed at a temperature lower than 600° C., the reduction time gets longer and the reduction does not completed properly. The reduction at over 1100° C. is possible, however the reduction of TiC may be interfered by generation of moisture upon the thermal treatment for reduction/carburization of TiC.

Also, it is preferred that the reduction/carburization is performed at a temperature between 1200° C. to 1350° C. When the temperature for reduction/carburization is lower than 1200° C., reduction/carburization is not sufficiently carried out. When it exceeds 1350° C. TiC, particles may grow, which makes it difficult to obtain ultra fine powder.

Now, preferred embodiments of the present invention is concretely described.

EXAMPLE 1

In this Example, 2000° C. of diluted aqueous HCl solution containing 8.6 wt % of $TiCl_3$ and 69.375 g of Co nitrate $(Co(NO_3)_2 \cdot 6H_2O)$ were added to 2000□ of distilled water while stirring, so that the final target composition after reduction/carburization was TiC-15 wt % Co, and then, spray-dryed. In the drying step, the supply rate of the solution was 20 cc/min, the nozzle rotation speed was set to 11,000 rpm, and the intake temperature of heated air and the outlet temperature was 250° C. and 110 to 130° C., respectively.

The spray-dried precursor salt powder was kept at about 700° C. for 2 hours to remove residual moisture and non-metallic salts. Thus, ultra fine Ti—Co based complex oxide powder was formed.

20.052 g of the salt-free Ti—Co based complex oxide powder and 9.948 g of carbon powder of 20 nm or less as a reducing or carburizing agent were added and ball-milled to obtain Ti—Co based complex oxide powder with carbon added.

The complex oxide powder was kept at about 800□ in an inert atmosphere for 6 hours and then at 1250° C. for 6 hours for reduction/carburization to form TiC-15 wt % Co complex powder. The prepared complex powder was characterized and the result is shown in Table 1.

Also, the complex powder was subjected to the X-ray diffraction test. TiC phase was observed as shown in FIG. 1. The crystal size of TiC was found to be about 35 nm.

Figure 2A:
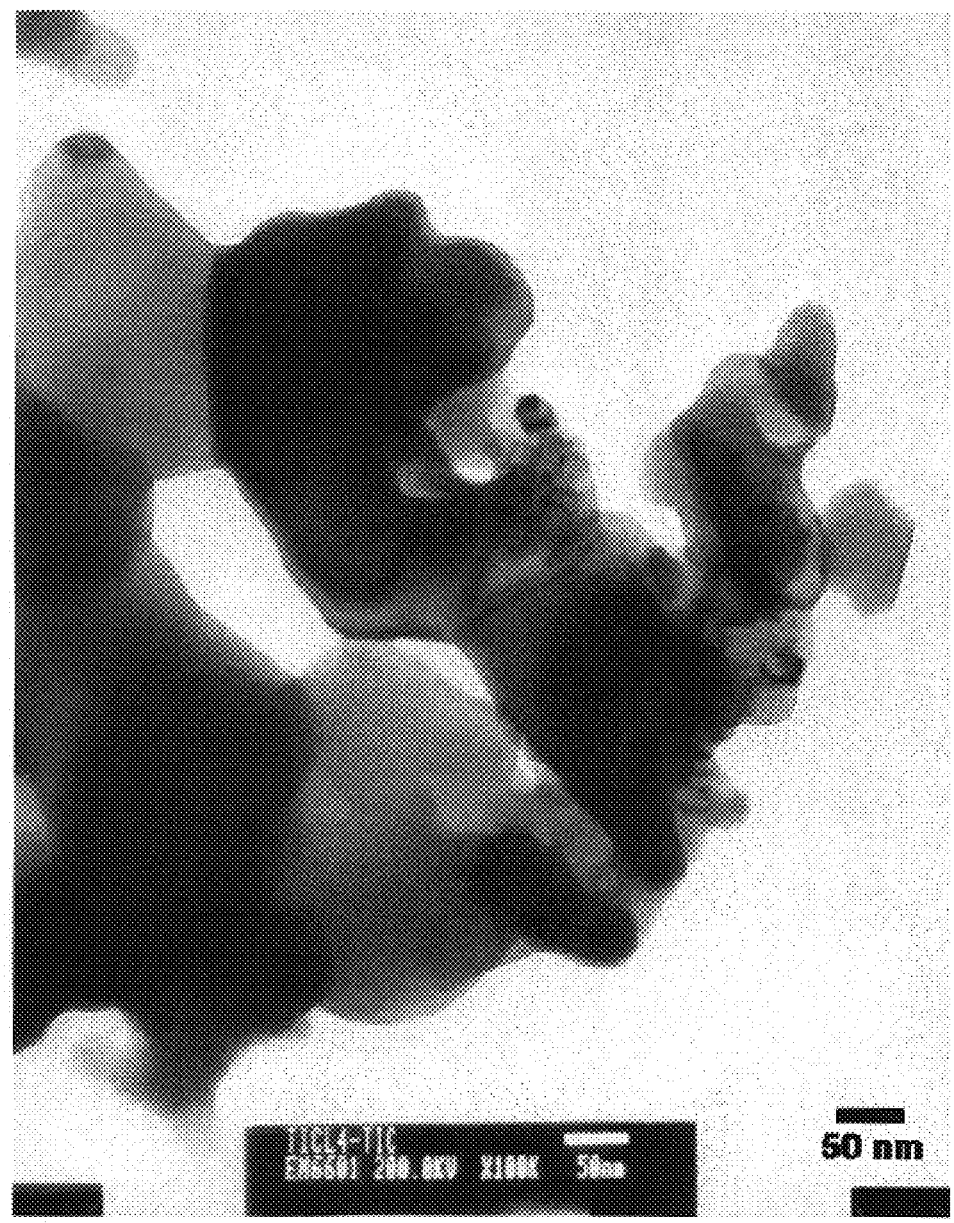
FIGS. 2a to 2c are tissue photographs of the TiC—Co complex powder prepared according to the present invention, taken by transmission electron microscopy.
Figure 2B:
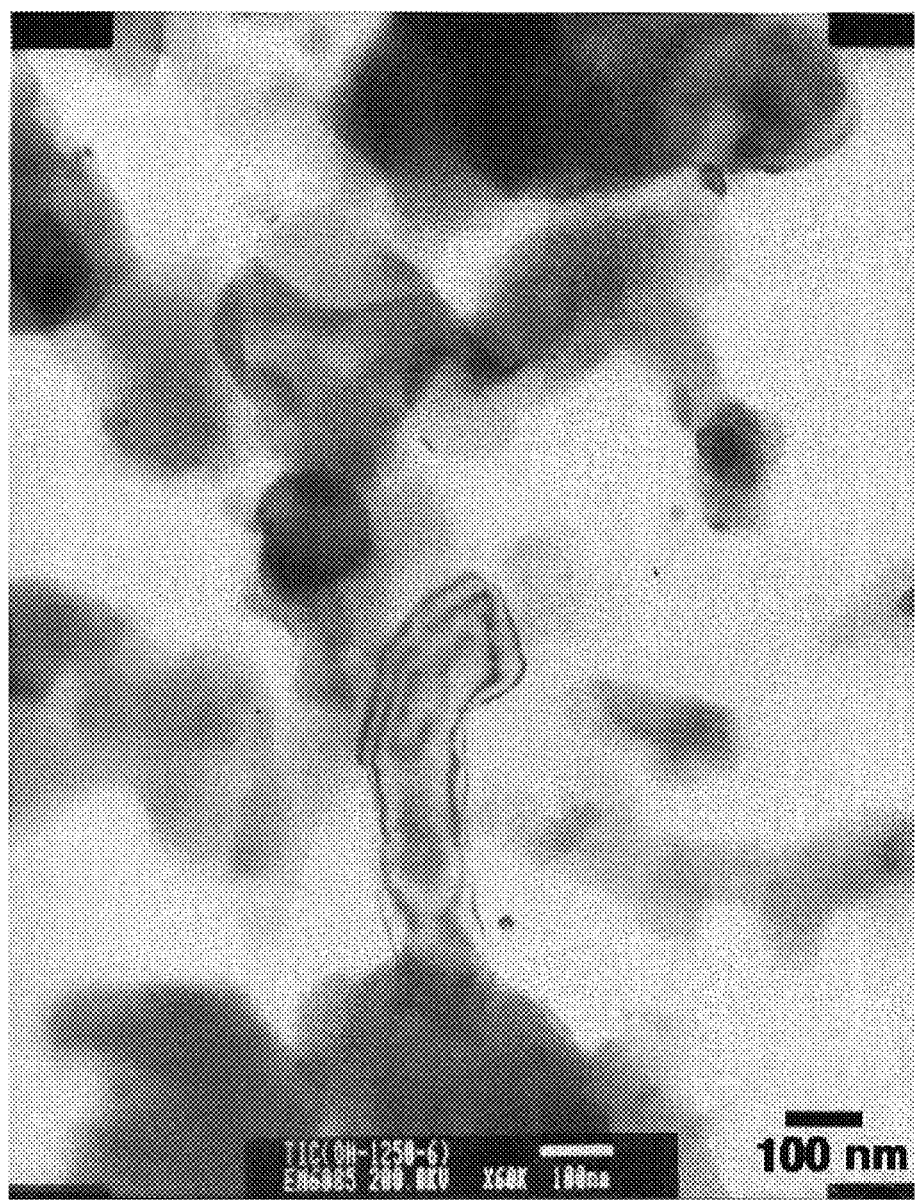
Figure 2C:
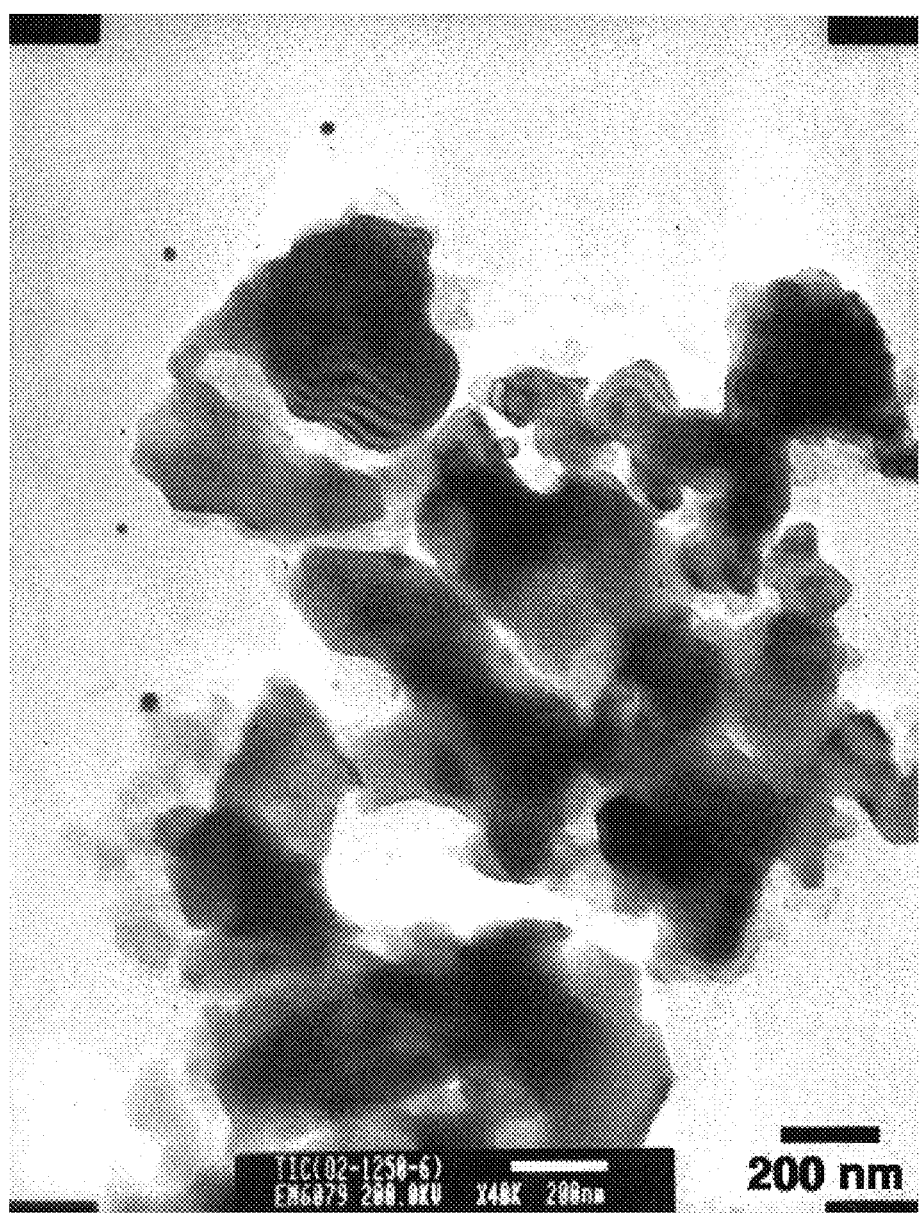

Meanwhile, upon examination of TiC—Co complex powder using a transmission electron microscope, it was confirmed that the powder contains particles having a size of 50 nm to 300 nm, as shown in FIG. 2.

EXAMPLE 2

In this Example, $TiO(OH)_2$ slurry which remains 2.344 wt % of $TiO_2$ and Co nitrate $(Co(NO_3)_2 \cdot 6H_2O)$ were used as starting materials. 984.91 ml of $TiO(OH)_2$ slurry and 15.083 g of Co nitrate were mixed while stirring to dissolve the Co nitrate and disperse $TiO(OH)_2$, so that the final target composition after reduction/carburization was TiC-15 wt % Co, and then, spray-dryed. In the drying step, the supply rate of the solution was 20 cc/min, the nozzle rotation speed was set to 19,000 rpm, and the intake temperature of heated air and the outlet temperature was 250° C. and 110 to 130° C., respectively.

The spray-dried precursor salt powder was kept at about 700° C. for 2 hours to remove residual moisture and non-metallic salts. Thus, ultra fine Ti—Co based complex oxide powder was formed.

20.052 g of the salt-free Ti—Co based complex oxide powder and 9.905 g of carbon powder of 20 nm or less as a reducing or carburizing agent were added and ball-milled to obtain Ti—Co based complex oxide powder with carbon added.

The complex oxide powder was kept at about 800° C. in an inert atmosphere for 6 hours and then at 1250□ for 6 hours for reduction/carburization to form TiC-15 wt % Co complex powder. The prepared complex powder was characterized and the result is shown in Table 1.

Also, the complex powder was subjected to the X-ray diffraction test. TiC phase was observed as shown in FIG. 1. The crystal size of TiC was found to be about 81 nm.

Meanwhile, upon examination of TiC—Co complex powder using a transmission electron microscope, it was confirmed that the powder comprises particles having a size of 50 nm to 300 nm, as shown in FIG. 2.

EXAMPLE 3

In this Example, nano-sized $TiO_2$ and Co nitrate (Co$(NO_3)_2 \cdot 6H_2O$) were used as starting materials. 344.768 g of nano-sized $TiO_2$ and 65.232 g of Co nitrate were added to 5000 ml of distilled water while stirring to dissolve the Co nitrate and disperse $TiO_2$, so that the final target composition after reduction/carburization was TiC-5 wt % Co, and then, spray-dryed. In the drying step, the supply rate of the solution was 20 cc/min, the nozzle rotation speed was set to 15,000 rpm, and the intake temperature of heated air and the outlet temperature was 250° C. and 10 to 130° C., respectively.

The spray-dried precursor salt powder was kept at about 500° C. for 2 hours to remove residual moisture and salts. Thus, ultra fine Ti—Co based complex oxide powder was formed.

19.164 g of the salt-free Ti—Co based complex oxide powder and 10.836 g of carbon powder of 20 nm or less as a reducing or carburizing agent were added and ball-milled to obtain Ti—Co based complex oxide powder with carbon added.

The complex oxide powder was kept at about 800° C. in an inert atmosphere for 4 hours and then at 1250° C. for 6 hours for reduction/carburization to form TiC-5 wt % Co complex powder. The prepared complex powder was characterized and the result is shown in Table 1.

Also, the complex powder was subjected to the X-ray diffraction test. TiC phase was observed as shown in FIG. 1. The crystal size of TiC was found to be about 45 nm.

Meanwhile, upon examination of TiC—Co complex powder using a transmission electron microscope, it was confirmed that the powder comprises particles having a size of 50 nm to 300 nm, as shown in FIG. 2.

As described above, according to the present invention, there is provided ultra fine TiC-transition metal based complex powder by dissolving or dispersing a Ti-containing water-soluble salt, nano-sized $TiO(OH)_2$ based slurry or $TiO_2$, and a transition metal-containing water-soluble salt in a suitable ratio, followed by spray-drying, to obtain complex oxide; mixing/milling the complex oxide with nano-sized carbon particles to obtain complex oxide/carbon mixture powder; and subjecting the powder to a thermal treatment for reduction/carburization in a non-oxidizing atmosphere.

While the present invention has been described with reference to the preferred examples, it is to be appreciated that those skilled in the art can make change or modification thereof without departing from the scope and spirit of the present invention and such change or modification fall in the scope of the present invention.

What is claimed is:

1. A method of producing TiC-transition metal-based complex powder, comprising the steps of:
   (a) preparing a raw material mixture by dissolving or dispersing a $TiO(OH)_2$ slurry, and cobalt nitrate in water, followed by spray-drying to obtain precursor powder;

(b) calcining the precursor powder to form ultrafine Ti—Co complex oxide powder;

(c) mixing the ultra fine Ti—Co complex oxide powder with nano-sized carbon particles, followed by drying to obtain complex oxide powder; and (d) subjecting the dried complex oxide powder to reduction/carburization in a non-oxidizing atmosphere wherein the reduction and carburization is performed by reduction at a temperature between 600° C. to 1100° C. and then reduction and carburization at a temperature between 1200° C. to 1350° C.

TABLE 1

| | Composition | Reduction conditions | Phases (XRD) | Size of TiC | Size of complex powder |
|---|---|---|---|---|---|
| Conventional Ex. 1 | 100 TiC | 1800° C., 2 h | TiC | 1~2 μm | — |
| Conventional Ex. 2 | 100 TiC | — | TiC | 0.7 μm | — |
| Ex. 1 | 85 TiC-15 Co | 800° C., 6 h + 1250° C., 6 h | TiC, Co | 35 nm | 50~300 nm |
| Ex. 2 | 85 TiC-15 Co | 800° C., 6 h + 1250° C., 6 h | TiC, Co | 81 nm | 50–300 nm |
| Ex. 3 | 85 TiC-5 Co | 800° C., 4 h + 1250° C., 6 h | TiC, Co | 45 nm | 50–300 nm |

In Table 1, Conventional Example 1 was TiC powder prepared by mixing $TiO_2$ having a particle size of 1 to 2 μm and carbon and performing reduction/carburization at about 1800° C. for 2 hours, and Conventional Example 2 was TiC powder prepared by ball-milling TiC powder having a particle size of about 325 mesh.

As can be seen from Table 1, it is noted that the TiC powder according to the present invention was finer than the conventional TiC powders and moreover, the TiC-transition metal based complex powder prepared therefrom was nano-sized ultra fine particles.

2. The method according to claim 1, wherein the content of the cobalt in the complex powder is in the range of 1 to 30 wt %.

3. The method according to claim 1, wherein the calcination is performed at a temperature between 350 to 1000° C.

4. The method according to claim 1, wherein the TiC—Co complex powder has a particle size of from 50 nm to 300 nm.

5. The method according to claim 1, wherein said TiC—Co complex powder is TiC-15 wt % Co complex powder.

6. A method of producing TiC-transition metal-based complex powder, comprising the steps of:
(a) preparing a raw material mixture by dissolving or dispersing a nano-sized $TiO_2$ and cobalt nitrate in water, followed by spray-drying to obtain precursor powder;
(b) calcining the precursor powder to form ultrafine Ti—Co complex oxide powder,
(c) mixing the ultra fine Ti—Co complex oxide powder with nano-sized carbon particles, followed by drying to obtain complex oxide powder; and
(d) subjecting the dried complex oxide powder to reduction/carburization in a non-oxidizing atmosphere wherein the reduction and carburization is performed by reduction at a temperature between 600° C. to 1100° C. and then reduction and carburization at a temperature between 1200° C. to 1350° C.

7. The method according to claim 6, wherein the content of the cobalt in the complex powder is in the range of 1 to 30 wt %.

8. The method according to claim 6, wherein the calcination is performed at a temperature between 350 to 1000° C.

9. The method according to claim 6, wherein the Ti—Co complex is TiC-15 wt % Co complex powder.

* * * * *